Dec. 15, 1931.  F. H. PAGE  1,837,132
MEANS FOR CONTROLLING AEROPLANES
Filed June 25, 1931    6 Sheets-Sheet 1

Dec. 15, 1931.  F. H. PAGE  1,837,132
MEANS FOR CONTROLLING AEROPLANES
Filed June 25, 1931  6 Sheets-Sheet 3

Frederick Handley Page
Inventor

Dec. 15, 1931.      F. H. PAGE      1,837,132
MEANS FOR CONTROLLING AEROPLANES
Filed June 25, 1931      6 Sheets-Sheet 5

Patented Dec. 15, 1931

1,837,132

UNITED STATES PATENT OFFICE

FREDERICK HANDLEY PAGE, OF LONDON, ENGLAND, ASSIGNOR TO HANDLEY PAGE LIMITED, OF LONDON, ENGLAND

MEANS FOR CONTROLLING AEROPLANES

Application filed June 25, 1931, Serial No. 546,891, and in Great Britain August 15, 1930.

This invention relates to improvements in means for controlling aeroplanes, and has for its object to maintain and even increase the lateral control when the stalling angle of the machine is closely approached during flight.

According to this invention apparatus for maintaining or increasing lateral control of aircraft comprises means for disturbing the air flow over either of the wings, said means being operable only when the wing approaches the stalling angle or is stalled.

Referring to the accompanying drawings:—

A "slat" is now the recognized term for an adjustable "forwardly located wing" or "auxiliary wing", which nests on the front of a main wing and which advances to open a slot when the angle of incidence increases so as to approach the stalling angle. In the position illustrated, the slat and the wing are close together, forming a wing of unbroken contour; the interceptor is inoperable, and the aileron is in its medial position.

Figure 1:
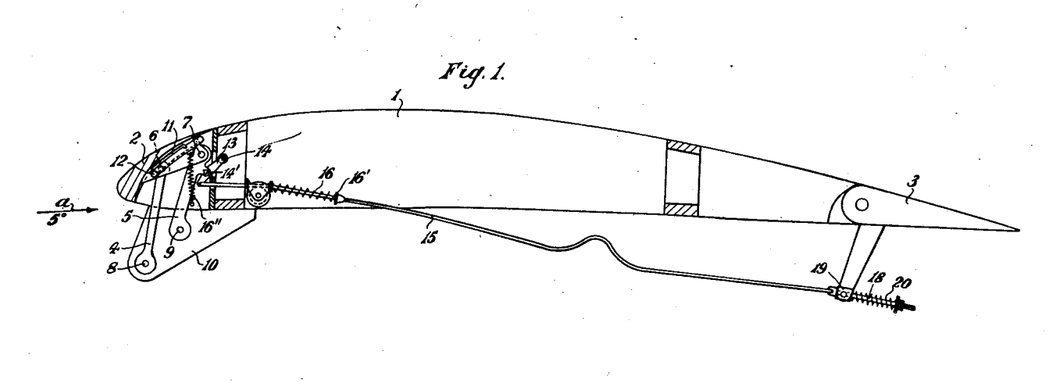
Fig. 1 is a diagrammatic section of a wing in which an interceptor is provided to disturb the airflow over the wing, this interceptor being controlled by a forwardly located slat.
Figure 2:
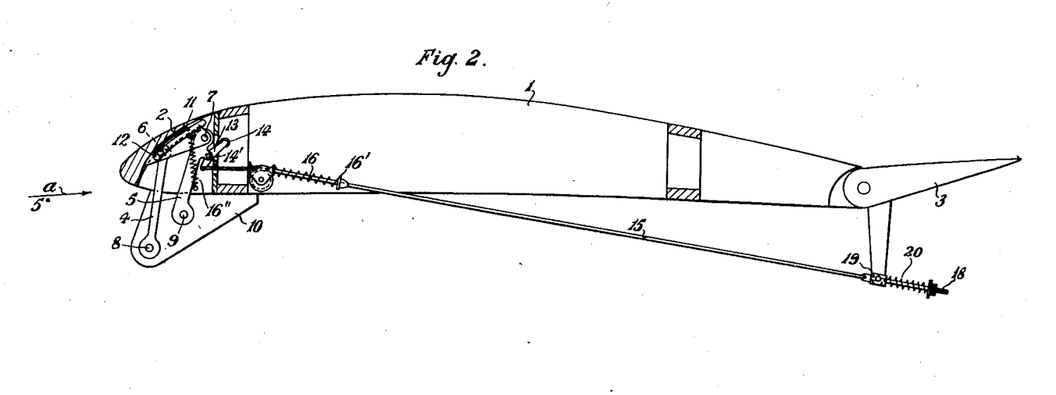
Fig. 2 is a similar view of the same wing with the slat and interceptor in the same positions as in Fig. 1, but with the aileron moved to its maximum upward position.
Figure 3:
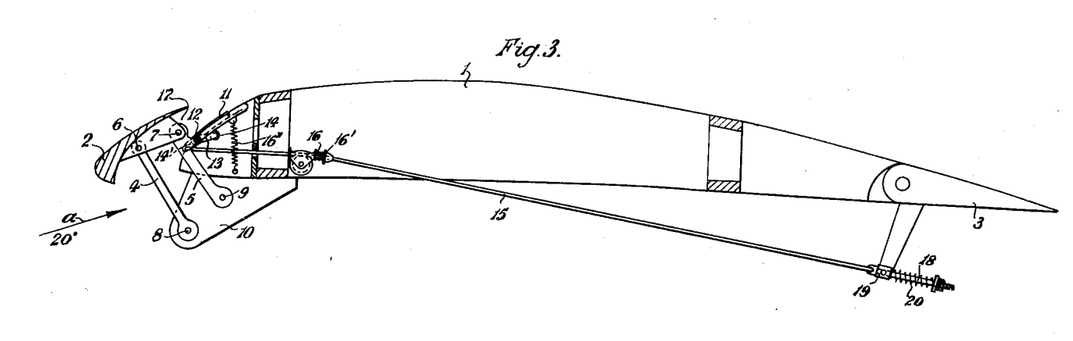
Fig. 3 is a similar view of the same wing with the slat drawn into the forward position by the change in pressure of the air on its surface and with the interceptor operating mechanism in a position in which the upward movement of the aileron would operate the interceptor, but showing the aileron in the medial position as in Fig. 1, and showing the interceptor in its retracted position.
Figure 4:
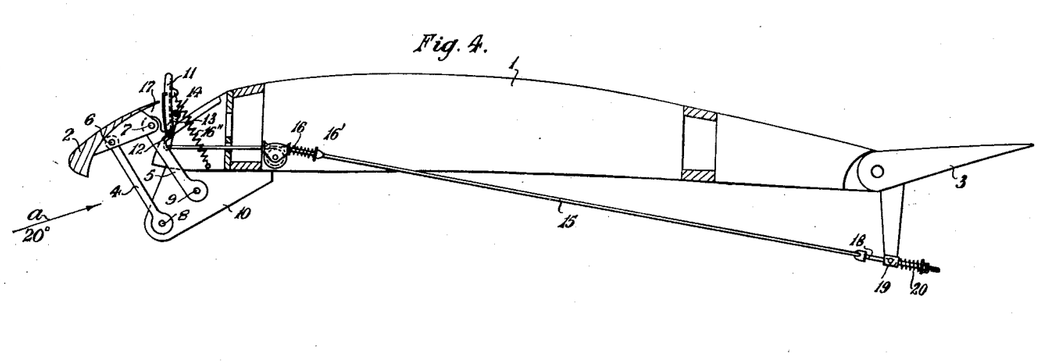
Fig. 4 is a similar view of the same wing as Fig. 3, but showing the aileron raised and showing the interceptor in the position to which it is raised by the aileron.

In Figs. 1 to 4, the main wing 1 has a slat 2 located in front of it and an aileron 3 at the rear. The slat is carried by links 4 and 5 pivoted at 6 and 7 to the slat and at 8 and 9 to a bracket 10 on the main wing. The interceptor 11 is located in the main wing and is covered by the slat when this slat is in its closed position, as shown in Figs. 1 and 2. This interceptor 11 is pivotally mounted at 12 to the main wing. The interceptor operating mechanism consists of a lever 13, pivoted at 14' on the link 5, having a roller 14 on its upper end and connected at its lower end to one end of a cable 15, the other end of which cable is connected to the aileron 3. A week spring 16 is provided between an abutment 16' on the cable and a fixed part of the main wing for maintaining the forward end of the cable taut. The lever 13 is movable forwardly with the slat 2, when this slat moves under pressure of air as the stalling angle is approached, from the position shown in Figs. 1 and 2, where the lever 13 is distant from the interceptor and the rear part of the cable 15 is sufficiently slack as to prevent the operation of the lever 13 by the aileron, to the position shown in Fig. 3, where the lever 13 is brought into a position in which its roller 14 is against the interceptor and the cable 15 is taut even when the aileron is in its medial position shown in Fig. 3. In this Fig. 3 position, upward movement of the aileron will cause the lever 13 to turn the interceptor 11 against the spring 16″ upwardly across the slot 17 between the slat 2 and the main wing 1, as shown in Fig. 4. A slight movement of the aileron 3 will be sufficient to raise the interceptor, and in order to increase the control, the aileron 3 is connected to the rear end of the cable by slidable connections consisting of a rod 18 and slide 19, so that further upward movement of the aileron beyond that required to raise the interceptor can be imparted to the aileron against the action of the spring 20.

Figure 5:
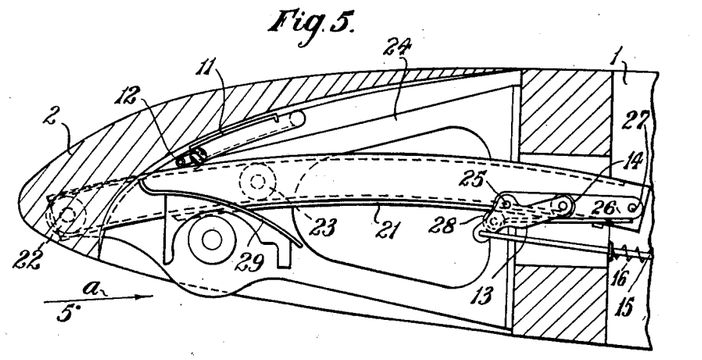
Figs. 5, 6 and 7 are similar views to Figs. 1, 3 and 4 respectively, of the leading portion of a wing fitted with an interceptor and with a slat and interceptor operating mechanism both carried by a track.
Figures 6, 7:
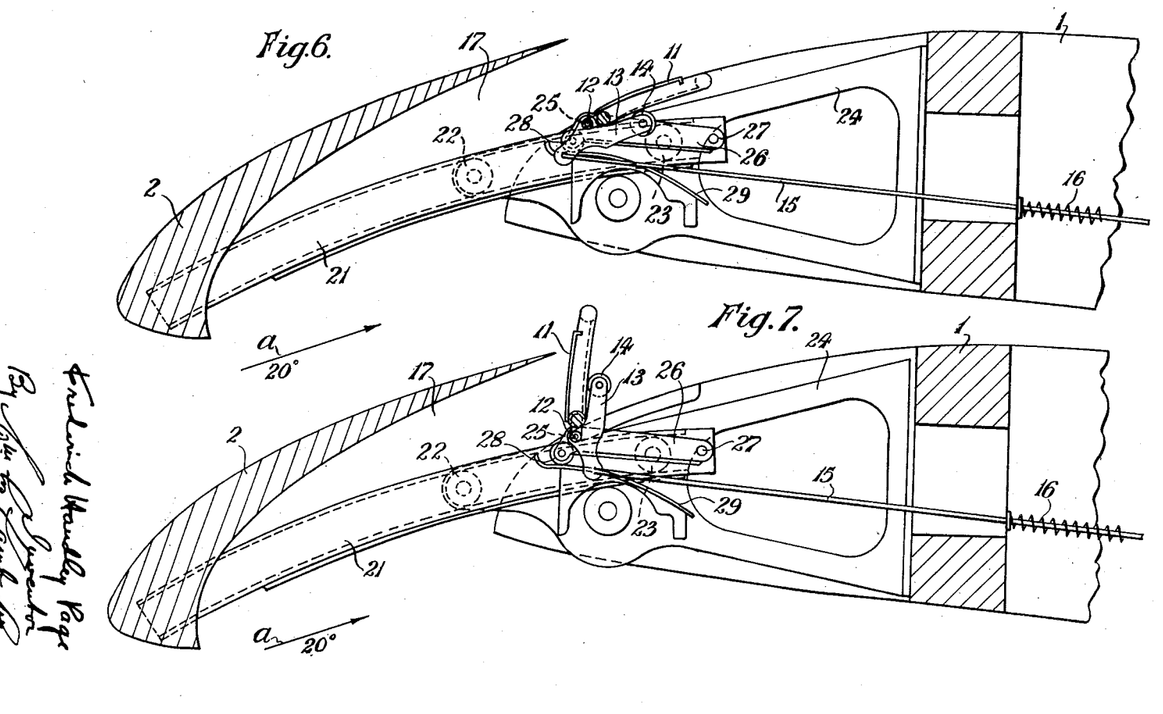

In the arrangement illustrated in Figs. 5 to 7, the slat 2 instead of being mounted on links, as in the first example illustrated, is attached to a track 21, which is conveniently of channel section suitable for enclosing two fixed rollers 22 and 23 carried by the bracket 24 fixed on the main wing. In this construction the slat is free to travel forwards in an arcuate path following the line of the track 21 when the air pressures on said slat draw it away from the main wing. In this case, the interceptor 11 is the same as in the first example and the interceptor operating lever 13 is pivotally attached at 25 to an arm 26 which is pivotally mounted at 27 on the track 21. The arm 26 is provided at its end with a roller 28 which, when the track moves forward, contacts with a curved surface 29, which curved surface acts to raise the interceptor operating lever and bring its roller 14 into contact with the interceptor.

In Fig. 5, the slat lies close against the wing and the interceptor operating lever is distant from the interceptor, and the cable 15 connecting said operating lever to the aileron is slack. When the slat 2 moves forwardly under pressure of air, the interceptor is uncovered and the interceptor operating lever is moved forward and upwardly into a position in which it is operable to raise the interceptor, and in which the cable 15 is taut, which position is shown in Fig. 6. If then the aileron is raised, the interceptor operating lever will move the interceptor 11 upwardly into the position shown in Fig. 7.

Figure 8:
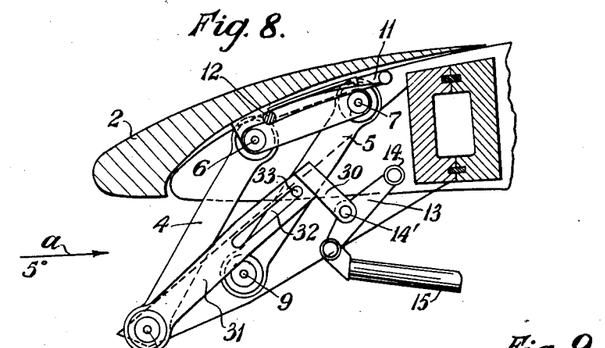
Figs. 8 and 9 are similar views to Figs. 1 and 3 respectively, of the leading portion of a wing showing a modification of the interceptor operating mechanism.
Figure 9:
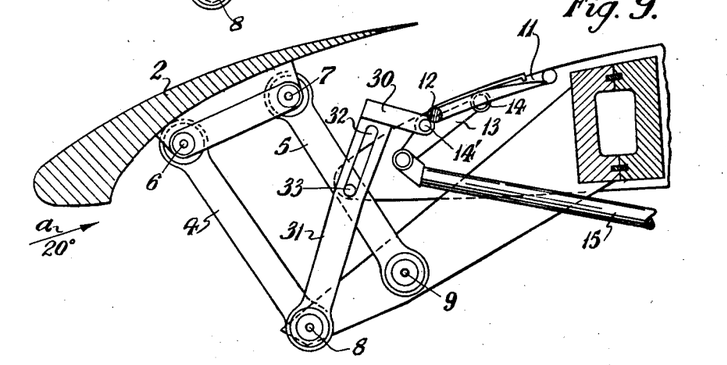

In a modification of the arrangement shown in Figs. 1–4, the interceptor operating lever need not be mounted directly on the link 5, but the mechanism may be arranged as shown in Figs. 8 and 9 in which the interceptor operating lever 13 has its pivot 14′ mounted on an extension 30 of a lever 31 pivoted at the same point 8 as that of the link 4 and having the slot 32 in which is mounted a pin 33 fixed on the rear link 5. Thus the forward movement of the slat 2 through the pin and slot connection 32, 33 pushes the lever 31 with the interceptor operating lever 13 upon it into the required position, shown in Fig. 9. Alternatively, the lever 31 instead of being used in conjunction with the arrangement shown in Figs. 1–4 and operated by links supporting the slat, could be used in conjunction with the arrangement shown in Figs. 5–7 and be operated by the track 21.

Figure 10:
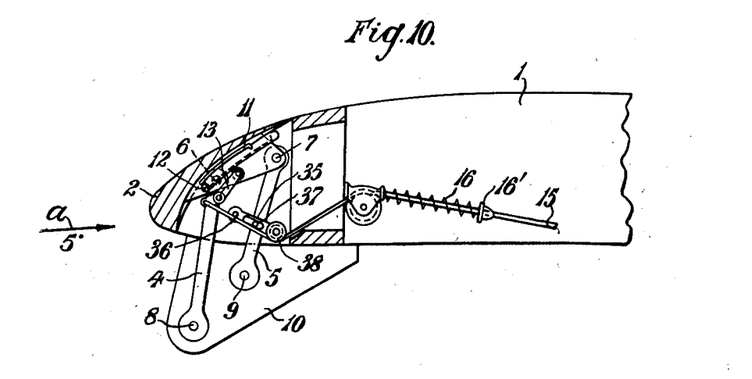
Figs. 10 and 11 are similar views to Figs. 1 and 3 respectively of the leading portion of a wing in which the slat when it moves forwardly away from the wing takes up the slack in a cable of the interceptor operating mechanism.
Figure 11:
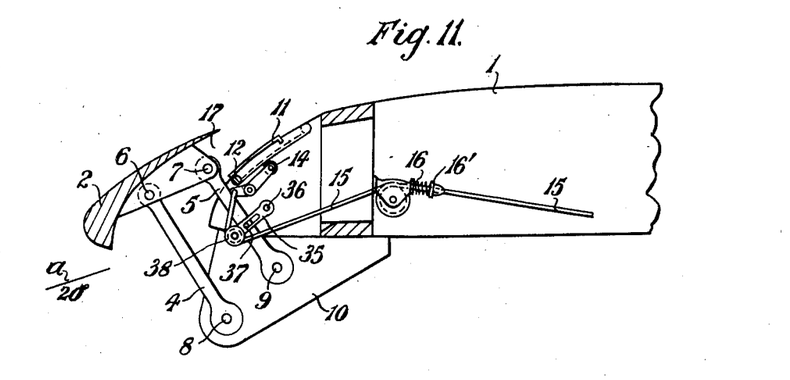

In a further construction shown in Figs. 10 and 11 the interceptor operating lever 13 is fixed in the wing adjacent the interceptor 11 and in an operative position, and the forward movement of the slat 2 is utilized for the purpose of taking up slack in the cable 15 connecting the interceptor operating lever with the aileron. The slack in the cable 15 is taken up, when the slat 2 moves forwardly under air pressure into the position shown in Fig. 11, by a rocking arm 35 pivotally mounted at 36 on the main wing having a pin and slot connection, indicated at 37, to the link 5 and carrying at its end a pulley 38 over which the cable 15 passes. When the slack in the cable is taken up the aileron can operate the interceptor operating lever.

In all of the constructions described, as the slat moves forward to open the slot it is caused to take up slack in a cable which connects the interceptor operating lever with the aileron. Alternatively, however, similar lost motion may be taken up in a connecting rod by the movement of the slat in a forward direction.

When the interceptor is moved by the upward movement of the aileron, it is desirable for the interceptor to complete its movement in the initial upward rise of 5° to 10° of the aileron, and yet it is not desirable that the aileron should be limited in its upward movement by its connection to the slat. The spring connection which is interposed in the cable connecting the aileron and the interceptor in the constructions illustrated, permit the aileron to be moved through a greater angle of adjustment without being prevented from doing so by the interceptor mechanism.

The interceptor is preferably arranged so as to intercept the flow of air through the slot when the interceptor is raised by the rising of the aileron. This gives the pilot the powerful control during flight of being able to destroy the supporting action of the slot of either wing by merely lifting the aileron.

Although the interceptor device has been considered above and described chiefly in conjunction with the automatic slot, it may be usefully applied to wings which are not fitted with slots provided some selecting mechanism is employed for preventing the operation of the interceptor except when the angle of incidence of the wing closely approaches the stalling angle, or the wing is stalled. The stalling angle is that at which with increase of angle the lift decreases instead of increases. The stalling angle is a definite angle on all wings but varies with each wing section. The interceptor device may therefore be so arranged that it is permitted to be operated by the upward movement of the aileron when the angle of incidence of the wing has approached, for instance, within 5° of the stalling angle, and the movement of the interceptor may be effected during the first movement of, say, 5° or 10° of the upward movement of the aileron.

Figures 12, 13:
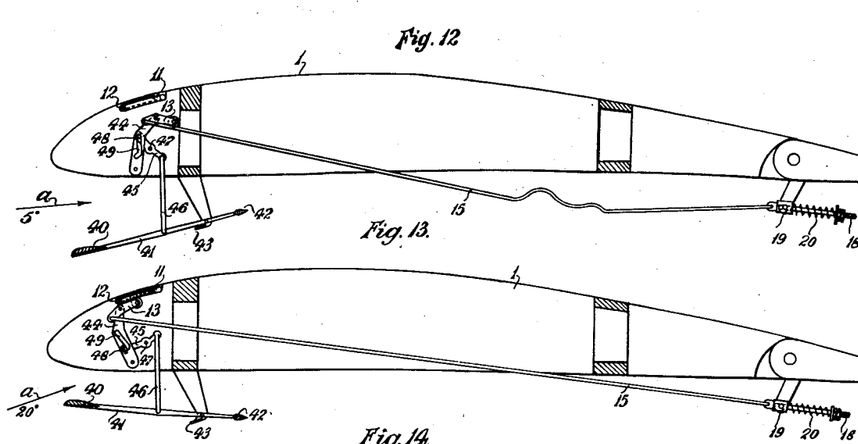
Figs. 12, 13 and 14 are similar views to Figs. 1, 3 and 4 respectively, of a wing in which the interceptor operating mechanism is moved into its operative position by an incidence device.
Figure 14:
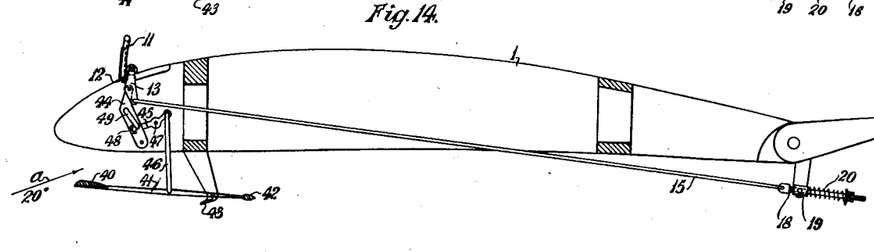

Such an arrangement applicable to wings not fitted with slots is indicated diagrammatically in Figs. 12 to 14 in which the interceptor operating lever 13 is moved forward by the incidence device, which device moves the interceptor operating lever forwardly into its operative position when the wing approaches the stalling angle, as indicated in Fig. 13.

This forward movement of the operating lever 13 takes up the slack in the cable, so that on subsequently raising the aileron, the interceptor is moved upwardly, as indicated in Fig. 14 to disturb the flow of air over the upper surface of the wing.

The incidence device consists of a small aerofoil 40 mounted on a lever 41 and statically balanced by the counterweight 42 at small angles of incidence, i. e. in normal flight the vane is in the position shown in Fig. 12 at a negative angle of incidence. Under influence of the pressure on the upper surface of the aerofoil 40, the lever 41 is pressed against the stop 43. The interceptor operating lever 13 is mounted on a swinging lever 44 which is connected with the incidence device by means of a rocking lever 45 and a connecting link 46. The rocking lever 45 is pivotally mounted at 47 on the main wing structure and is provided with a pin 48 engaging in a slot 49 in the swinging lever 44.

The angle of the incidence device in Fig. 12 relatively to the longitudinal axis of the aircraft has to be determined in such a way that except when the main wing approaches the stalling angle or is stalled, the incidence device will remain in the position shown in Fig. 12. When the main wing approaches the stalling angle or is stalled, however, the incidence device will move upwardly into the position shown in Fig. 13. This upward movement rocks the rocking lever 45 and causes the pin 48 engaging in slot 49 to move the swinging lever 44 into the position shown in Fig. 13 and pushing the interceptor operating lever 13 with it into a position against the interceptor plate ready for action. Due to the shape of the slot 49, the arrangement ensures that the lever 44 is locked when in its forward position so that it cannot be pulled back under influence of the force in connecting cable 15 between interceptor operating lever 13 and the aileron 3.

Another device which is controlled in its position or its angle by the attitude of the machine, may be employed for bringing the connecting mechanism between the aileron and the interceptor into operation at the predetermined angle of incidence, providing such mechanism moves with sufficient force under the influence of the change in angle of the air flow relatively to the machine. For this purpose a small slat located on the leading edge of the wing may be used without necessarily being of sufficient width in the direction of the span of the wing to give any considerable slot action.

The intreceptor is not required to project above the wing surface during normal flight, nor is it required to project into the air flow when the angle of incidence of the machine has increased to an angle approaching the stalling angle, where, for instance, slats if provided would move forward and open the slot between themselves and the front portion of the wing, except when such angle has been attained and the aileron behind it is moved upwards.

What I claim as my invention and desire to secure by Letters Patent is:—

1. In aircraft, the combination of aircraft wings; means for disturbing the airflow over said wings; operating means adapted to render the means for disturbing the airflow effective over one wing while leaving the means for disturbing the airflow over the opposite wing ineffective and vice versa; and means movable solely by the action of air pressure on its surface, adapted to prevent said operating means from functioning at small angles of incidence but adapted to permit said operating means to function after the angle of incidence of the wings exceeds a pre-determined greater angle.

2. In aircraft, the combination of aircraft wings; means for disturbing the airflow over said wings; ailerons on said wings; operating means connecting the means for disturbing the airflow to the aileron on each wing; and means movable solely by the action of air pressure on its surface, adapted to prevent said operating means from functioning at small angles of incidence but adapted to permit said operating means to function after the angle of incidence of the wings exceeds a pre-determinad greater angle.

3. In aircraft, the combination of aircraft wings; means for disturbing the airflow over said wings; operating means adapted to render the means for disturbing the airflow effective over one wing while leaving the means for disturbing the airflow over the opposite wing ineffective and vice versa; and slats movable towards and away from the wings solely by the action of air pressure on the surface of said slats, adapted to prevent said operating means from functioning at small angles of incidence but adapted to permit said operating means to function after the angle of incidence of the wings exceeds a pre-determined greater angle.

4. In aircraft, the combination of aircraft wings; means for disturbing the airflow over said wings; ailerons on said wings; operating means connecting the means for disturbing the airflow to the aileron on each wing; and slats movable towards and away from said wing solely by the action of air pressure on the surface of said slats, adapted to prevent said operating means from functioning at small angles of incidence but adapted to permit said operating means to function only after the angle of incidence of the wings exceeds a pre-determined greater angle.

5. In an aircraft wing construction, the combination of a slat movable towards and away from said wing solely by the air pressure on its surface; an interceptor; an aileron; and means connecting said interceptor and slat to said aileron, adapted to cause said interceptor to be raised only when the slat is away from said wing and the aileron is raised.

6. In an aircraft wing construction, the combination of a slat movable towards and away from said wing solely by the air pressure on its surface; an interceptor located beneath said slat, adapted to be covered by said slat when this slat is against the wing; an aileron; and means connecting said interceptor and slat to said aileron, adapted to cause said interceptor to be raised only when the slat is away from said wing and the aileron is raised.

7. In an aircraft wing construction, the combination of a slat movable towards and away from said wing solely by the air pressure on its surface; an interceptor; an aileron and elastic connections between said interceptor, said slat and said aileron, adapted to permit the aileron to have full unimpeded movement and adapted to cause said interceptor to be raised only when the slat is away from said wing and the aileron is raised.

8. In an aircraft wing construction, the combination of a slat movable towards and away from said wing solely by the air pressure on its surface; an interceptor; an aileron; connecting means having lost motion between said interceptor and said aileron; and means on said slat to take up the lost motion in said connecting means when the slat is away from the wing, adapted to cause said interceptor to be raised only when the slat is away from said wing and the aileron is raised.

9. In an aircraft wing construction, the combination of, a slat movable towards and away from said wing solely by the air pressure on its surface; an interceptor; interceptor operating means for moving said interceptor into its intercepting position; means connecting said interceptor operating means to said slat, adapted to move the interceptor operating means into its operative position only when the slat is away from said wing; an aileron on said wing; and means connecting said interceptor operating means to said aileron, adapted to cause said interceptor to be moved into its intercepting position only when the slat is away from said wing and the aileron is raised.

10. In an aircraft wing construction, the combination of, a slat movable towards and away from said wing solely by the air pressure on its surface; links adapted to support and guide said slat in its forward and return movements; an interceptor; interceptor operating means for moving said interceptor into its intercepting position; means connecting said interceptor operating means to said links, adapted to move the interceptor operating means into its operative position only when the slat is away from said wing; an aileron on said wing; and means connecting said interceptor operating means to said aileron, adapted to cause said interceptor to be moved into its intercepting position only when the slat is away from said wing and the aileron is raised.

11. In an aircraft wing construction, the combination of, a slat movable towards and away from said wing solely by the air pressure on its surface; a track for the slat which permits a sliding movement to and fro; an interceptor; interceptor operating means for moving said interceptor into its intercepting position; means connecting said interceptor operating means to said track adapted to move the interceptor operating means into its operative position only when the slat is away from said wing; an aileron on said wing; and means connecting said interceptor operating means to said aileron adapted to cause said interceptor to be moved into its intercepting position only when the slat is away from said wing and the aileron is raised.

12. In an aircraft wing construction, the combination of, a slat movable towards and away from said wing solely by the air pressure on its surface; mechanism for supporting and guiding the slat in its forward and return movements; an interceptor; interceptor operating means for moving said interceptor into its intercepting position; a lever carrying said interceptor operating means, adapted to permit said operating means to be moved into and out of its operative position; means connecting said lever to said mechanism, adapted to move the interceptor operating means into its operative position only when the slat is away from said wing; an aileron on said wing; and means connecting said interceptor operating means to said aileron, adapted to cause said interceptor to be moved into its intercepting position only when the slat is away from said wing and the aileron is raised.

13. In an aircraft wing construction, the combination of means for disturbing the airflow over the wing; an aileron; a slat movable towards and away from the wing solely by the air pressure on its surface; elastic connecting means between said means for disturbing the airflow and said aileron, having lost motion; and means connected to said slat for taking up said lost motion when the slat is away from the wing, adapted when the slat is against the wing to permit the aileron to have full unimpeded movement, and adapted when the slat is away from the wing to permit a small upward movement of the aileron to impart full movement to said means for disturbing the airflow while further movement of the aileron beyond that necessary to impart the full movement to said means for disturbing the airflow is unimpeded.

14. In an aircraft wing construction, the combination of means for disturbing the airflow over the wing; operating means, adapted to move said means into its disturbing position; an aileron; a slat movable towards and away from the wing solely by the air pressure on its surface; elastic connecting means between said operating means and said aileron; and means for causing said slat to move said operating means, adapted when the slat is against the wing to permit the aileron to have full unimpeded movement, and adapted when the slat is away from the wing to permit a small upward movement of the aileron to impart full movement to said means for disturbing the airflow while further movement of the aileron beyond that necessary to impart the full movement to said means for disturbing the airflow is unimpeded.

15. In aircraft, the combination of aircraft wings, means for disturbing the airflow over said wings; operating means adapted to render the means for disturbing the airflow effective over one wing while leaving the means for disturbing the airflow over the opposite wing ineffective and vice versa, and an incidence device movable relatively to the wings solely by the action of air pressure on its surface, adapted to prevent said operating means from functioning at small angles of incidence but adapted to permit said operating means to function after the angle of incidence of the wings exceeds a predetermined greater value.

16. In an aircraft wing construction, the combination of, an incidence device movable relatively to said wing solely by the air pressure on its surface; an interceptor; an aileron; and means connecting said interceptor and incidence device to said aileron, adapted to cause said interceptor to be raised only when the incidence device is moved past a pre-determined position and the aileron is raised.

17. In an aircraft wing construction, the combination of, an incidence device movable relatively to said wing solely by the air pressure on its surface; an interceptor; an aileron; means connecting said interceptor to said aileron, having lost motion; means operable by said incidence device for taking up said lost motion when the incidence device is moved past a predetermined position, adapted to cause said interceptor to be raised only when the incidence device is moved into said pre-determined position and the aileron is raised.

18. In an aircraft wing construction, the combination of, an incidence device movable relatively to said wing solely by the air pressure on its surface; an interceptor; interceptor operating means for moving said interceptor into its intercepting position; means connecting said operating means to said incidence device, adapted to move the interceptor operating means into its operative position only when the incidence device is moved past a predetermined position; an aileron; and means connecting said interceptor operating means to said aileron, adapted to cause said interceptor to be raised only when the incidence device is moved into said pre-determined position and the aileron is raised.

19. In an aircraft wing construction, the combination of means for disturbing the airflow over the wing; an aileron; an incidence device movable relatively to the wing solely by the air pressure on its surface; elastic connecting means between said means for disturbing the airflow and said aileron, having lost motion; and means connected to said incidence device for taking up said lost motion when the incidence device moves past a pre-determined position, adapted before the incidence device passes said pre-determined position to permit the aileron to have full unimpeded movement, and adapted after the incidence device has passed said pre-determined position to permit a small upward movement of the aileron to impart full movement to said means for disturbing the airflow while further movement of the aileron beyond that necessary to impart the full movement to said means for disturbing the airflow is unimpeded.

20. In an aircraft wing construction, the combination of means for disturbing the airflow over the wing; operating means adapted to move said means into its disturbing position; an aileron; an incidence device movable relatively to the wing solely by the air pressure on its surface; elastic connecting means between said operating means and said aileron; and means for causing said incidence device to move said operating means into its operative position only when said incidence device has passed a predetermined position, adapted before the incidence device has passed said pre-determined position to permit the aileron to have full unimpeded movement, and adapted after the incidence device has passed said pre-determined position to permit a small upward movement of the aileron to impart full movement to said means for disturbing the airflow while further movement of the aileron beyond that necessary to impart the full movement to said means for disturbing the airflow is unimpeded.

In witness whereof I have hereunto set my hand.

FREDERICK HANDLEY PAGE.